2 Sheets--Sheet 1.

J. HARRIS.
Water-Wheel.

No. 5,034. Reissued Aug. 20, 1872.

Attest
Robert Hyndman
Herman Merrell.

Inventor
Joel Harris
By Wood & Boyd
Attys.

AM. PHOTO-LITHOGRAPHIC CO. N.Y. (OSBORNE'S PROCESS.)

2 Sheets--Sheet 2.

J. HARRIS.

Water-Wheel.

No. 5,034. Reissued Aug. 20, 1872.

Attest
Robert Hyndman
Herman Merrell

Inventor
Joel Harris
By Wood & Boyd
Attys.

AM. PHOTO-LITHOGRAPHIC CO. N.Y. (OSBORNE'S PROCESS)

UNITED STATES PATENT OFFICE.

JOEL HARRIS, OF NEW CARLISLE, INDIANA, ASSIGNOR TO EDMUND E. WOOD, TRUSTEE.

IMPROVEMENT IN WATER-WHEELS.

Specification forming part of Letters Patent No. 235, dated January 29, 1861; reissue No. 5,034, dated August 20, 1872.

*To whom it may concern:*

Be it known that I, JOEL HARRIS, of New Carlisle, in the county of St. Joseph and State of Indiana, have invented certain new and useful Improvements in Water-Wheels; and I do declare that the following is a full, clear, and exact description thereof, reference being had to the accompanying drawing making a part of this specification, in which—

Figure 1:
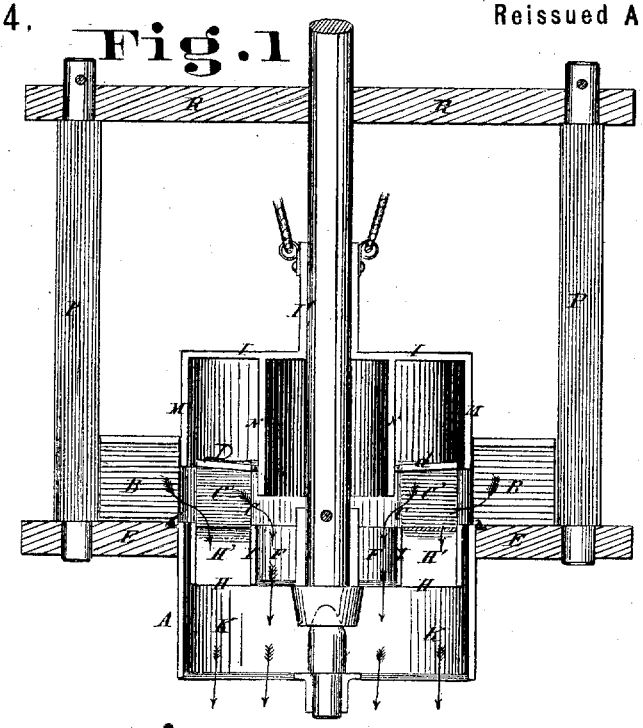
Figure 2:
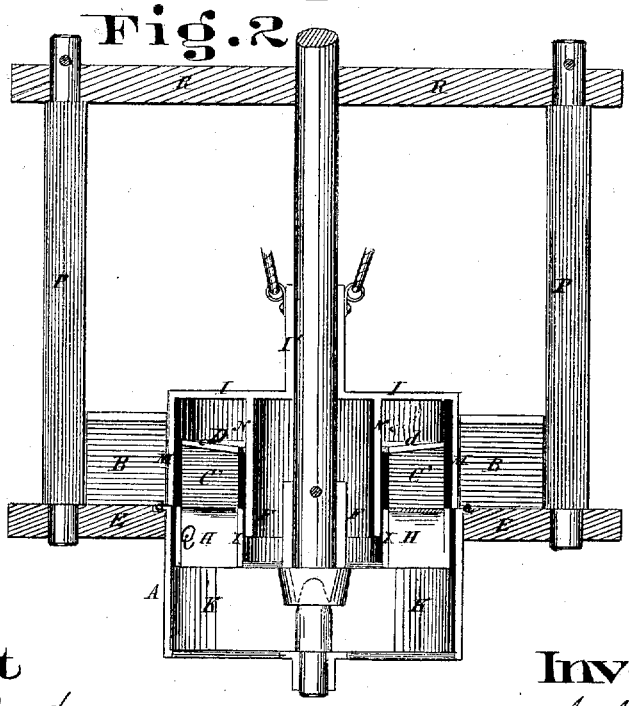
Figure 3:
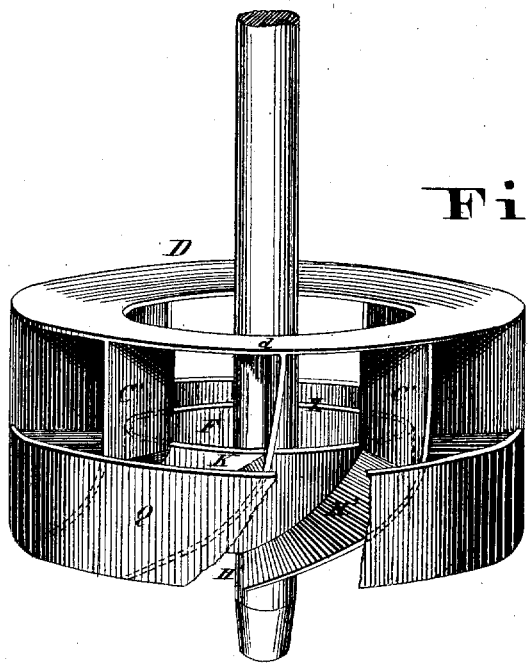
Figure 4:
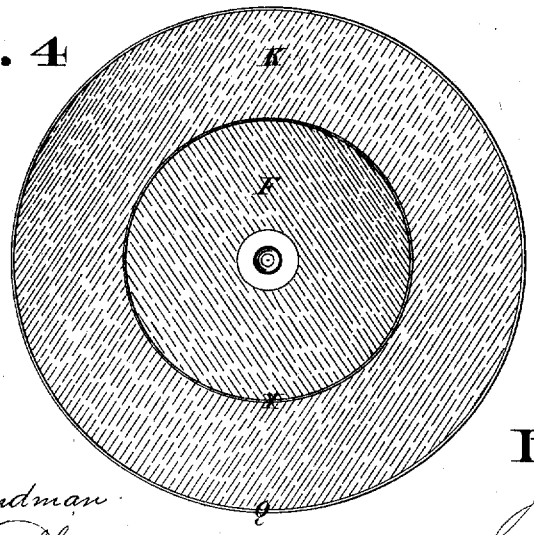

Figure 1 is a vertical section of the wheel and case with the compound gates open. Fig. 2 is the same with the gates closed. Fig. 3 is a perspective view of the wheel embodying my invention with a portion of the ring removed so as to show the lower series of bucket-orifices. Fig. 4 is a plan view of the bottom of the wheel when full of water.

The nature of my invention relates to the construction of a water-wheel and a water-wheel case; and consists, first, in the provision and arrangement in a water-wheel of buckets around a central shaft, to which they are attached, in such a manner as to receive the water from horizontal chutes, and to form a central chamber within them and around the shaft, as well as an annular chamber surrounding the central one; second, in a water-wheel adapted to receive the maximum quantity of water which can be utilized by means of the provision of two series of bucket-orifices of nearly equal area, which void the water in two separate columns, one discharging into the central chamber, and the other into the annular chamber; both columns after they leave the wheel, uniting and passing through the space beyond one end thereof at nearly right angles to the general direction of the inflow. Third, in the combination of such a wheel with a compound vertical gate and water-guides forming chutes.

D is the water-wheel. A is the tub or cylindrical casing. *a a* are flanges or plates attached to the casing, and form a seat and cap for attaching plates or water-guides B B to. These parts may be constructed and attached in any form or manner heretofore employed in wheels of this character. E is a bed-plate, upon which the casing A rests. This casing is so constructed as to inclose and support the wheel D by means of the step resting in a bridge-tree; it should, therefore, be properly secured to the bed-plate by bolts or other suitable means. *d* is an annular plate, to which vanes C′ H′ are attached, and it may be of any known form of construction. This wheel is different from ordinary turbine water-wheels, which usually discharge the water either vertically as in the Jonval wheel, or centrally into a central chamber within the inner ends of the vanes, as in what are called center-vent wheels. My wheel combines the principles of operation of both these, and embodies them both in the methods of receiving and discharging the water, while it is at the same time adapted to receive the maximum quantity of water, the power of which can be properly utilized. To accomplish these results two sets of bucket-orifices are provided. The upper set, C C, are arranged in the manner and position usually employed in center-vent wheels, and these orifices should be of such a size as to void the proper quantity of water into the central chamber F. The other series, H H, are formed like and correspond with ordinary discharge-orifices in the Jonval water-wheels, the vanes being of such a shape as to void the water into an annular chamber below them. The vanes may be of any desired shape and angle, consistent with the purpose which they are designed to accomplish. F is a central chamber around the shaft, formed by the inner ends of the vanes C′ and the cylindrical plate X. K is an annular chamber between and formed by the plates X and Q, within which chamber the vanes H′ are arranged. It is obvious that the chambers F and K may be made of any proportion to each other by increasing or diminishing the radial width of the buckets. The cylindrical plate X separates the water discharged from the upper orifices from that which is acting on the Jonval part of the wheel, and secures the vertical discharge of the water from the lower series of orifices, as well as forms a part of the wall and support of the buckets. The ring Q is attached to the outer surfaces of the vanes to give strength and support to the buckets and wheel. The gate is composed of a disk, I, of sufficient diameter to cover the wheel, and having a sleeve, I′, surrounding the shaft. To this disk is attached a cylindrical plate, M, surrounding the periphery of the buckets, and a similar one, N, similarly attached, of a diameter a little less than the diameter of the center chamber F. When the gates are closed, as shown in Fig. 2, the outer plate M shuts down upon the top of the casing A between the guides B and the buckets C′, and the inner plate N shuts down between the buckets and the shaft of the wheel. The inner plate N being longer than the other one M, the upper series of discharge orifices are never fully open until the gates are fully raised, as shown in Fig. 1, when about one-half the water entering between the guides B will be discharged downward through the buckets H′, while the remainder will be discharged centrally through the chamber F. The gates may be suspended by cords or rods attached to a governor above, or any suitable device may be employed to operate them. P P are posts or stanchions, which carry the beam R, in which beam is an axis for the shaft.

What I claim as new, and desire to secure by Letters Patent, is—

1. A water-wheel with two series of bucket-orifices of nearly equal area, which void the water in two separate columns, one discharged into the central chamber F, and the other vertically through the annular space K, substantially as herein set forth.

2. A water-wheel with vanes and two series of bucket-orifices of nearly equal area, so arranged that the path of one column of water through the wheel is central to the chamber F and of another vertically through the annular space K, substantially as described.

3. The compound vertical gate, composed of the parts I, I′, M, and N, in combination with the wheel D and guides B, substantially as shown and described.

In testimony whereof I have hereunto set my hand.

JOEL HARRIS.

Witnesses:
GEO. H. SERVICE,
S. C. LANCASTER.